May 5, 1925.  
E. E. DAVIDSON  
1,536,080  
TIRE BEAD AND METHOD OF MAKING TIRES  
Filed Dec. 19, 1921
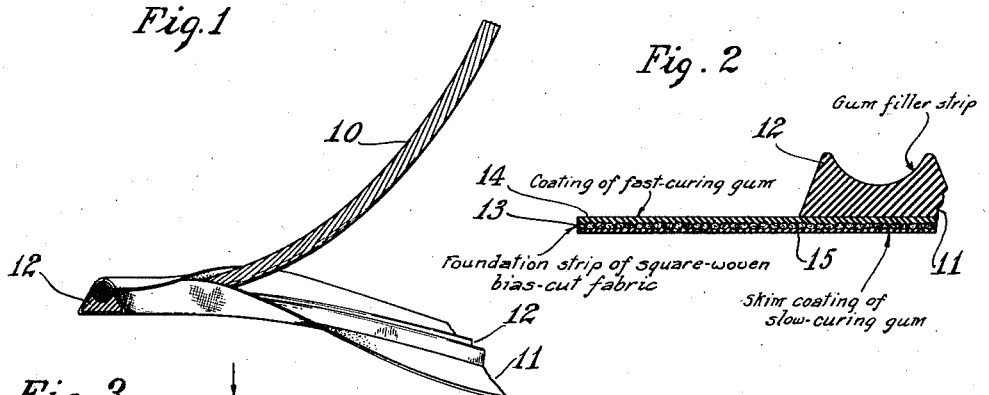
Inventor  
E.E. Davidson  
By Robert M. Pierson  
Atty.

Patented May 5, 1925.

1,536,080

UNITED STATES PATENT OFFICE.

ELIAS E. DAVIDSON, OF AKRON, OHIO, ASSIGNOR TO THE B. F. GOODRICH COMPANY, OF NEW YORK, N. Y., A CORPORATION OF NEW YORK.

TIRE BEAD AND METHOD OF MAKING TIRES.

Application filed December 19, 1921. Serial No. 523,323.

*To all whom it may concern:*

Be it known that I, ELIAS E. DAVIDSON, a citizen of the United States, residing at Akron, in the county of Summit and State of Ohio, have invented a certain new and useful Tire Bead and Method of Making Tires, of which the following is a specification.

This invention relates to the art of making tires, and especially pneumatic tire casings whose edges are provided with fabric-covered bead cores. In order to secure adequate adhesion between the bead core and the adjacent layers of the tire carcass, it has heretofore been customary to buff the rubberized fabric bead covers and provide them with a coating of vulcanizable rubber cement, especially when the bead-core has been semi-cured to preserve its shape before being incorporated in the tire. The object of my invention is to avoid the expense and time consumed in the buffing and cementing operation, and thus effect a saving in the cost of producing the tire casing.

Of the accompanying drawings, Fig. 1 is a perspective view, partly in section, showing a bead cover and gum filler in the course of application to an extensible wire bead ring.

Fig. 2 is an enlarged cross-section showing a portion of the rubberized fabric strip and filler strip made up according to my invention.

Fig. 3 is a longitudinal, vertical section of a vulcanizer for the semi-curing step containing a car with bead cores suspended thereon.

Fig. 4 is a sectional, perspective view of a portion of the completed pneumatic tire casing.

In practicing the invention in its preferred form, I provide an inextensible wire ring 10, of any suitable type, and a composite strip 11, shown in Figs. 1 and 2, for enwrapping the same. This composite strip includes a filler strip 12 of known type composed of a suitable rubber compound for forming the body of the filler to embed the wire ring 10 and a foundation strip 13 of bias-cut, woven fabric which is calendered on its inner side with a relatively-thick coating 14 of vulcanizable rubber compound and on its outer side with a relatively-thin coating 15 of vulcanizable rubber compound. By regulating the amount of sulfur and choosing suitable accelerators in the respective compounds, the filler strip 12 and the inner coating 14 are made relatively fast-curing, and the outer coating 15 is made relatively slow-curing.

The composite strip 11 is then applied to the wire ring 10 in the manner indicated in Fig. 1 and the edges of the rubberized fabric strip are progressively folded and lapped longitudinally about said ring to make a raw bead core 16 (Fig. 3) of triangular section.

A number of these raw bead cores are strung upon a rack 16 on a car 18, which is then run into a horizontal vulcanizer 19, and the cores are subjected to heating in open steam to a degree sufficient to semi-vulcanize the strip 12 and inner coating 14 and cause them to amalgamate as a filler embedding the wire ring 10, but insufficient to substantially cure the rubber in the outer coating 15, the latter remaining soft and tacky.

The bead cores 16 are then taken from the vulcanizer and built into the edges of the tire casing 20 and the latter is subjected to vulcanization in the usual manner, with the result of completing the cure of the filler and also curing the external rubber coating 15 on each bead core so that perfect adhesion is secured between said core and the rubberized fabric plies of the tire carcass.

It will be obvious that the foregoing steps may be more or less modified without departing from my invention. It is possible to omit the sulfur entirely from the rubber in the coating 15 and rely upon migration of sulfur from the carcass rubber to cure this coating, although I prefer to incorporate some sulfur in said coating, the relative rates of cure being regulated largely by the choice of accelerators.

I claim:

1. The method of making pneumatic-tire casings which comprises providing a fabric cover with an external coating of slow-curing rubber, enclosing a core-ring and a filler of fast-curing rubber with said cover, semi-curing the resulting bead core to a degree which partially vulcanizes the filler and leaves the external coating soft and tacky, incorporating the bead core in the edge of the tire casing, and vulcanizing said casing.

2. The method of making tire casings which comprises coating a fabric cover strip on its inner side with a layer of fast-curing rubber and on its outer side with a layer of slow-curing rubber, wrapping said strip about a wire ring to make a bead core, semi-curing said bead core, building it into the edge of the tire casing and vulcanizing said casing.

3. A semi-cured bead core for tires comprising before curing a core ring, a filler of fast-curing rubber embedding said ring, and a fabric cover having an external coating of slow-curing rubber.

4. A semi-cured bead core for tires comprising before curing a core ring and a fabric cover therefor having on its inner side a layer of fast-curing rubber and on its outer side a layer of slow-curing rubber.

5. A semi-cured bead core for tires comprising before curing, a filler having an accelerator incorporated therein and a fabric cover carrying slow curing rubber.

6. A method of making tires which consists in forming a bead core by covering a rubber bead filler of rubber compound, having an accelerator incorporated therein, with fabric carrying a slow curing rubber compound, partially curing the bead core thus formed, incorporating said partially cured bead core in the tire carcass, and thereafter vulcanizing the said carcass.

In witness whereof I have hereunto set my hand this 9th day of December, 1921.

ELIAS E. DAVIDSON.